(12) United States Patent
Tormasov et al.

(10) Patent No.: US 11,263,090 B2
(45) Date of Patent: Mar. 1, 2022

(54) SYSTEM AND METHOD FOR DATA PACKING INTO BLOBS FOR EFFICIENT STORAGE

(71) Applicant: Acronis International GmbH, Schaffhausen (CH)

(72) Inventors: Alexander Tormasov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 108 days.

(21) Appl. No.: 16/700,433

(22) Filed: Dec. 2, 2019

(65) Prior Publication Data
US 2020/0174893 A1    Jun. 4, 2020

Related U.S. Application Data

(60) Provisional application No. 62/774,467, filed on Dec. 3, 2018.

(51) Int. Cl.
*G06F 11/14*    (2006.01)
*G06F 16/182*    (2019.01)
*G06F 16/13*    (2019.01)

(52) U.S. Cl.
CPC .......... *G06F 11/1464* (2013.01); *G06F 16/13* (2019.01); *G06F 16/183* (2019.01); *G06F 2201/84* (2013.01)

(58) Field of Classification Search
CPC .... G06F 11/1464; G06F 16/183; G06F 16/13; G06F 2201/84; G06F 16/116; G06F 16/119; G06F 11/1451; G06F 16/275; G06F 2201/81
USPC ........................................................ 707/654
See application file for complete search history.

(56) References Cited

U.S. PATENT DOCUMENTS

| | | | | |
|---|---|---|---|---|
| 5,999,943 | A * | 12/1999 | Nori .................. | G06F 16/24562 |
| 2011/0196822 | A1* | 8/2011 | Zunger .................. | G06F 16/27 707/609 |
| 2011/0258225 | A1* | 10/2011 | Taylor ................. | G06F 16/2272 707/769 |

\* cited by examiner

*Primary Examiner* — Evan Aspinwall
(74) *Attorney, Agent, or Firm* — Arent Fox LLP; Michael Fainberg

(57) ABSTRACT

Disclosed herein are systems and method storing data. In an exemplary aspect, a method comprises determining a threshold data size for objects in a target data system; generating a data blob that has an allocated size of at least the threshold data size, wherein the data blob comprises at least one data set; identifying a data set stored in a source data system for backup to the target data system; determining whether a size of the data set is less than the threshold data size; and responsive to determining that the size of the data set is less than the threshold data size, inserting the data set into the data blob; and writing the data blob to the target data system.

20 Claims, 4 Drawing Sheets

SYSTEM AND METHOD FOR DATA PACKING INTO BLOBS FOR EFFICIENT STORAGE

CROSS-REFERENCE TO RELATED APPLICATIONS

This application claims the benefit to U.S. Provisional application No. 62/774,467, filed on Dec. 3, 2018, the contents of which is hereby incorporated by reference in its entirety. Field of technology The present disclosure relates generally to the field of data management, more specifically, to systems and methods of data packing into blobs for efficient storage.

BACKGROUND

In an increasingly common scenario, a user of a computer or server has to manage and deal with a large number of files, even though the user does not necessarily need all of the files at a given moment. At the same time, the storage devices of a computer or server, with which the user works directly, has a limited amount of resources (e.g., disk space). Some files have to be archived, which typically involves creating a backup of the files by copying the contents of the storage devices onto some other medium (such as another hard disk drive, a DVD ROM, a DVD RAM, a flash disk, tape drive, etc.) or, frequently, over a network (such as to a remote server or to a cloud storage service).

SUMMARY

Exemplary aspects are described herein in the context of a system, method, and computer program product for storing data backup and archives. In an exemplary aspect, a method comprises determining a threshold data size for objects in a target data system; generating a data blob that has an allocated size of at least the threshold data size, wherein the data blob comprises at least one data set; identifying a data set stored in a source data system for backup to the target data system; determining whether a size of the data set is less than the threshold data size; and responsive to determining that the size of the data set is less than the threshold data size, inserting the data set into the data blob; and writing the data blob to the target data system.

In one aspect, the data set is a first data set, and prior to writing the data blob to the target data system, the method comprises inserting a second data set that has a file size less than the threshold data size into the data blob.

In one aspect, the data blob is written to the target data system in response to determining that a file size of the data blob exceeds the threshold data size.

In one aspect, responsive to determining that the size of the data set is greater than or equal to the threshold data size, the method comprises writing the data set to the target data system as a data object.

In one aspect, the data blob includes an index comprised of a plurality of object names and paths to objects contained within the data blob.

In one aspect, the method comprises modifying the index of the data blob to include a reference to the data set.

In one aspect, determining the threshold data size associated with the target data system is based on a technical parameter comprised of at least one of a storage type of the target data system, a hardware parameter associated with the target data system, and a network configuration of the target data system.

In one aspect, the method comprises determining a data parameter associated with the data set, wherein the data parameter is comprised of at least one of a data priority score, a data access rate, or data recovery rate associated with the data set, and wherein the threshold data size associated with the target data system is determined based on the data parameter.

In one aspect, the method comprises receiving a request to retrieve a second data set from the target data system; issuing to the target data system a "get blob" command indicating a reference to the data blob in which the second data set is contained; receiving the data blob; determining the location of the second data set based on an index contained in the data blob; extracting the data set from the data blob based on the determined location.

In one aspect, the contents of the data blob are transparent for user access.

In one aspect, an API is utilized to insert the data set into the data blob.

It should be noted that the methods described above may be implemented in a system comprising a hardware processor of the source data system. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
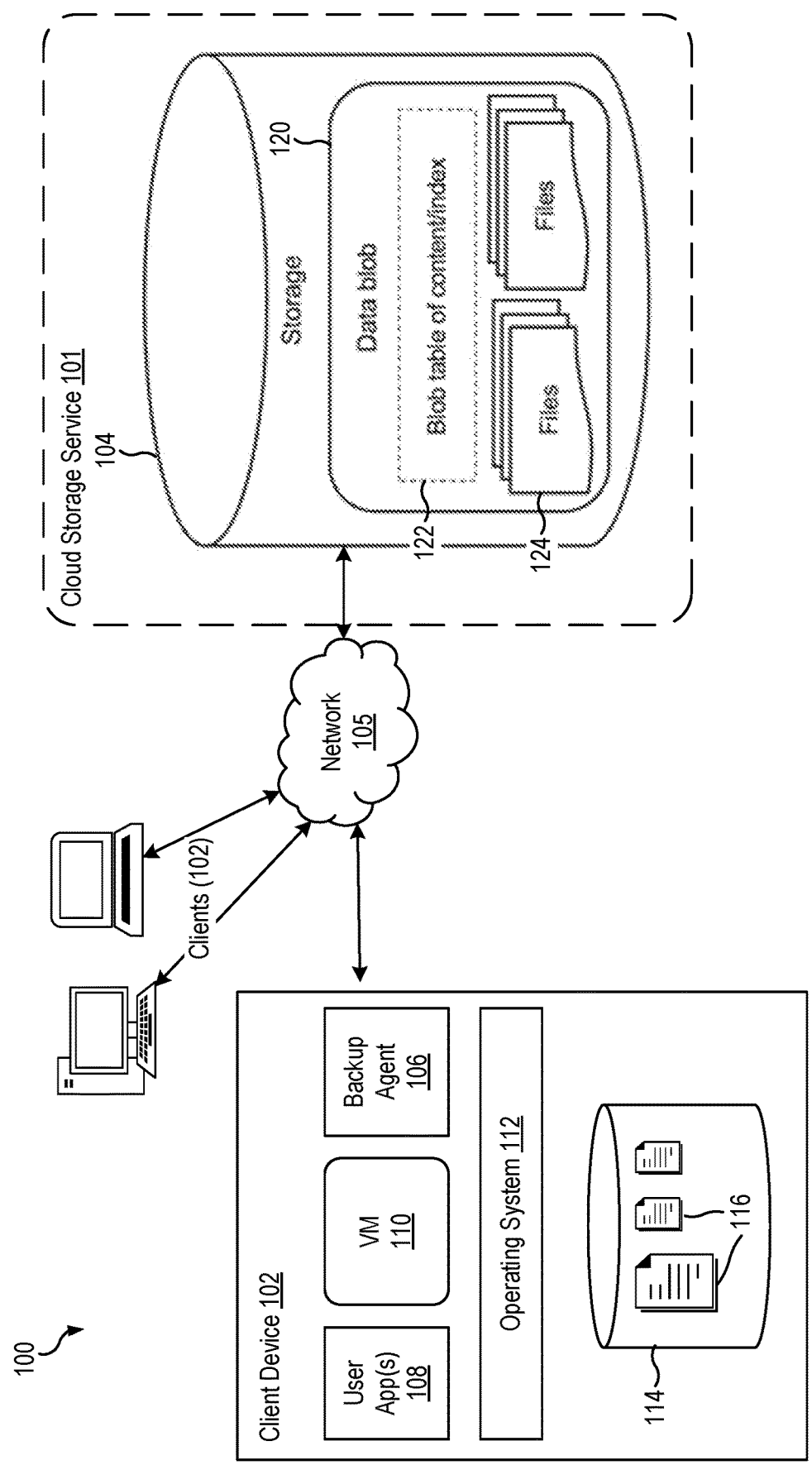
FIG. 1 is a block diagram illustrating a system for storing data backup and archives according to an exemplary aspect.

Exemplary aspects are described herein in the context of a system, method, and computer program product for storing data backup and archives. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Object storage is a type of data storage architecture (and services that use such an architecture) that manages data as objects, which has become popular due to its prevalence in cloud storage services. Object storage may be considered a form of a distributed key/value storage service, where keys (unique indexes) and values (opaque data) is accessed via PUT, GET, and LIST interfaces. Some object storage systems are optimized for storing large files (e.g., on order of hundreds of megabytes, or gigabytes). As a result, it has been determined that in such systems the operational performance decreases significantly for use cases of storing smaller portions of data (e.g., less than 100 kilobyte files). It has been further determined that any file operations with a large number of small files will be performed much slower than with the large files having an equivalent total size. This performance penalty affects the writing, reading, and checking of data in the storage system because many small files will require more I/O operations, thus affecting the overall speed of data management. Additionally, for third-party object storage services (such as Amazon S3®), each storage request may have a corresponding cost or be subject to request limits. The more file operations that are required, the more expensive it is to store the many smaller files. Therefore, it has been determined that use cases in which many small files are stored using such object storage services or specialized large-format storage systems, performance issues and even cost issues can arise. While some aspects of the present disclosure refer to object storage systems in particular, it is understood that the described technique can be applied to any storage system. For example, some hardware storage systems are designed for storing large files such as virtual machine disk files (also referred to as virtual machine images) that store state data of a virtual machine and any application and user data stored within the virtual disk drive of the virtual machine.

Accordingly, aspects of the present disclosure optimize data storage in data centers, both in terms of improving data management performance and in terms of reducing storage costs. This optimization is achieved by combining and storing small-sized objects into "blobs"—large binary objects that acts a container for storing smaller objects. An object may be classified as a small-sized object if the size of the object is less than a threshold load size of the particular system (e.g., the file system). For example, if a VMware file system is designed to work with images in 1 gigabyte, any object with a size less than 1 gigabyte may be classified as a small object. As described in greater detail below, each blob includes an index that acts as a table of contents, i.e., listings the file names and paths to each smaller file stored inside the blob. Aspects of the present disclosure provide transparent data packaging, i.e., packing data into blobs and keeping an index inside the blob which is suitable for file location. Such techniques may be implemented by a data backup or data archival system that packs the data into blobs itself (rather than relying on a subsystem of the storage system to do so), when there are certain files or data stream, the backup system can put a boundary of efficiency versus inefficiency of storage depending on each respective file size.

It is understood that, while the present techniques and systems are discussed in the context of data backup and archiving, aspects of the present disclosure may be applied to any type of storage operations.

FIG. 1 is a block diagram illustrating a system 100 for storing data backup and archives according to an exemplary aspect. The system 100 includes one or more client computing devices 102 communicatively connected to an object storage system 104 via a network 105. The storage system 104 may be any hardware- and software-based service designed to store user data (e.g., data archives and data backups). The client devices 102 may be any computers which send their data to be archived or backed up onto the storage system 104. The data sets refer to any files stored in the storage, and data blocks refer to a data stream that is split into portions with a predefined size. At least one client device 102 may be executing a workload using at least one application 108 within an execution environment provided by an operating system 112.

The client computing device 102 may be further configured to store data in the object storage system 104, for example, such as data backups and/or data archives associated with the workload of the application 108 or of other data that is stored on the client device 102. The client device 102 may be configured to execute a backup procedure that uses blobs, which are binary containers that contain smaller objects, based on a threshold file size, which is a predefined limit, according to which any file can be stored a-is (e.g., if the file size is bigger than the threshold value) or put into a blob (e.g., if its file size is smaller than the threshold value).

Each client device 102 may include an operating system 112 configured to support execution of one or more system or user applications 108 and a data store 114. The data store 114 is configured to store program code and software modules associated with the applications 108, and user data and/or state data generated and maintained by the operating system 112 and applications 108. In some aspects, the client device 102 may be configured to execute a virtual machine 110 or other virtualized execution environment (e.g., virtual container) which is software that emulates execution of a physical computing device. Such a virtual machine (VM) 110 may be backed by one or more virtual machine disk files (e.g., VMDK files) that provided persistence and emulation of a virtual hard drive. Each VM may have a corresponding VM image, which is a packaged file or files of virtual machine state data and all files contained within the virtual hard drive of the VM.

In an aspect, each client device 102 may include a backup agent 106 configured to generate a backup or copy of data 116 stored in the data store 114 of the client device, and store the backup(s) in a secondary storage system such as the object storage system 104. In one implementation, the backup agent 106 may be configured to store, retrieve, modify, search, and/or access data in the object storage system 104 via an application programming interface (API), REST-based interface (e.g., using PUT, GET, LIST operations), or other interfaces exposed by the cloud storage service 101.

The data 116 in the data store 114 (to be backed up) may include program data files of an application 108 as well as user data associated with the application, which taken together represent an execution state of the application. For example, the application 108 may have a multi-tier software architecture in which data stored in a data layer of the multi-tier application is backed up by the backup system agent 106. In another example, the data 116 in the data store may be one or more virtual disk files for a VM instance 110 which represent the state of the virtual machine, and which are backed up by the backup agent 106.

A backup generated by the backup agent 106 may include a copy of files, folders, data, meta-data, and/or information stored on the data store 114. In one aspect, a backup may be a sector-by-sector copy of a disk, including a copy of the operating system 112, registry, drivers, data files of software applications 108, all files and folders (including hidden and system files), boot record, file allocation tables (FAT), and other system data. Such backups may also be referred to as a disk image (which may further include a master boot record, or MBR) or a partition image. In some aspects, the backups may be stored in a particular format for compression and/or packaging, such as a True Image Backup™ format (*.tib) made available by Acronis®, ISO images, VHD files, and other file formats. In some aspects, the backups may be "full" backups having a replica of the entirety of a system disk, volume, partition, or other data storage of the client device 102. In some cases, the backup system may generate incremental backups which contains all changes that have been made since the latest incremental or full backup was created. In other cases, the backup system may generate differential backups which contain all changes that have been after a full backup creation (i.e., cannot be chained to another differential or incremental backup). The backup system may generate a full backup based on a prior full backup and at least one incremental/differential backup by collapsing the backups into a single backup file.

In one aspect, the object storage system 104 may be provided by a cloud storage service 101. The object storage system 104 (also referred to as object-based storage) may include one or more storage devices configured to provide a data storage architecture that manages data as objects, in contrast to a file system-based storage architecture (which manages data in a file hierarchy) or a block-based storage architecture (which manages data as blocks within sectors and tracks of physical media). The object storage system 104 is configured to store units of data as "objects" (also referred to as "blobs" by some service providers), and maps each object to a unique identifier (e.g., key, index, object name). The object storage system 104 may have a flat hierarchy and include a plurality of buckets for organizing the data objects. Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

In some cases, the backup agent 106 may be copying a large number of small files to the object storage 104, resulting in the performance issues discussed above. In some scenarios, the small files may be copies of corresponding small files on the data store 114 of the client device. In other scenarios, the small files may be incremental backups of the data store 114 for example in cases where the state of the client device has not changed significantly (e.g., fewer changed blocks for the incremental backup).

Accordingly, to resolve the issue with a large number of small files, the backup agent 106 is configured to generate a data blob 120 for storage in the object storage system 104. The data blob 120 is configured as a logical container for any number of data objects or files 124. In some aspects, the data blob 120 may contain a plurality of files 124 which are copies of the files 116 on the client device 102, or are files derived from the files 116 (e.g., incremental backup or delta disks). From the perspective of the object storage system 104, the data blob 120 appears as a single indivisible binary object. That is, a single data blob 120 is stored at the smallest level of granularity retrievable by access requests to the object storage system 104. From the perspective of the backup agent 106, the data blob 120 contains any number of smaller data objects or files 124.

The files 124 may be arranged in a number of configurations within the data blob 120. For example, the files 124 may be concatenated together within the data blob 120. In another example, the files 124 may be arranged in predefined offset locations within the data blob (e.g., array index).

In one aspect, the data blob 120 includes an index 122 that is configured as a table of contents for the files 124 within the data blob. In some aspects, the index 122 may include a listing of filenames of the files 124 and paths (i.e., addresses) to each corresponding file 124. The structure of the index 122 may depend based on the specific file system. For example, NTFS has a MFT meta-information block. An example of the index 122 is the table of contents of a file, which indicates where the object of interest is located.

According to an aspect, the backup agent 106 is configured to provide transparent data packaging during data backup and/or archiving operations. The backup agent 106 packs data (e.g., files 116) into data blobs 120 and maintains an index 122 that is suitable for file locations within that blob. In some aspects, the backup agent 106 creates a data blob on-the-fly and/or adds to the blob its content. Rather than rely on system-level optimizations, the backup agent 106 applies the data packaging technique at the storage level in response to handling certain files or data stream and in accordance with a determined boundary of storage efficiency-inefficiency depending on the file's size.

In one aspect, the backup agent 106 may be configured to package the files 124 into a data blob according to technical parameters, which are related to logical volumes of the storage system 104, the place of storage of data, etc., as well as the cost of data storage. The backup agent 106 may calculate the cost of packing and retrieving the files 124 into a data blob. Depending on such a profitability analysis, the backup agent 106 can store a file as a whole (e.g., as a first-order object in the object storage system 104), or when the threshold for inefficiency is reached, merge the files 124 into one data blob, adding content to it.

In one aspect, the backup agent 106 may define or determine the file-size threshold based on technical parameters, cost parameters, data-related parameters, or any combination thereof. Technical parameters may be related to the specifications and configurations of the system 100 and individual components therein, including the client device 102, the object storage system 104, and network 105. For example, the technical parameters may include the type of storage of the object storage system 104 (e.g., Amazon S3®, EMC® disk array), hardware parameters, and network settings (e.g., channel speed). Hardware parameters may include the size of a file system or cluster block, whether there are continuous physical addresses with a data storage pitch, data stripping speed and other available bus parameters, etc.

The cost parameters may be related to the cost incurred for the backup agent 106 to access the object storage system, such as when the object storage system is provided by a third-party cloud storage service provider. Cost parameters may include CPU operational costs (e.g., $0.0049 per Hour), disk read/write costs (e.g., $0.0007 per GB), and I/O operations costs (e.g., $0.005 per 1,000 requests).

The data parameters may be related to the data itself (e.g., files 124) that is to be stored in the object storage system 104. For example, the backup agent 106 may determine a data importance rating associated with a file 124 that indicates a value of the data (e.g., low, high). In another example, the backup agent 106 may determine a data access rate associated with a file 124 to be stored that indicates how often the data is accessed (e.g., historically, or predicted). In another example, the backup agent 106 may determine a data recovery rate associated with a file 124 that indicates how fast the data may need to be restored from backup/archive in case of disaster recovery procedures are activated.

Based on the determined threshold, the backup agent 106 may put the data, which the user sends to the storage system 104, into regular files (data blocks) or may combine the files 124 into data blobs, using commands such as "get blob", "get path to file", or other similar access requests. The commands can be like analogous to S3 requests and may only be transferred to a lower level. The commands allow for organizing the consolidation of small blobs into large blobs. In another implementation, there may be two separate APIs. One API may be dedicated to working with the entire blob itself, and the second API may be for mounting blobs and working with their content.

In some aspects, the threshold size can be calculated upon initialization, setup, or configuration of the backup agent 106 with respect to the object storage system 104. In other aspects, the threshold size can be calculated (or re-calculated) each time a write operation for a file to the object storage system is handled by the backup agent. In some aspects, the threshold size is calculated based on a pre-determined storage efficiency policy that is based on technical aspects (e.g., how file size affects storage performance) and an aspect of data value. The storage efficiency policy may be selected to sacrifice performance and keep some small files separate from the blob if these particular files are important (e.g., data importance rating) and there is a need for the ability to access such files quickly (i.e., the use of the data blob improves the performance of the storage and archiving in general but individual files can be read/written more slowly than if the files were outside of the blob).

Figure 2:
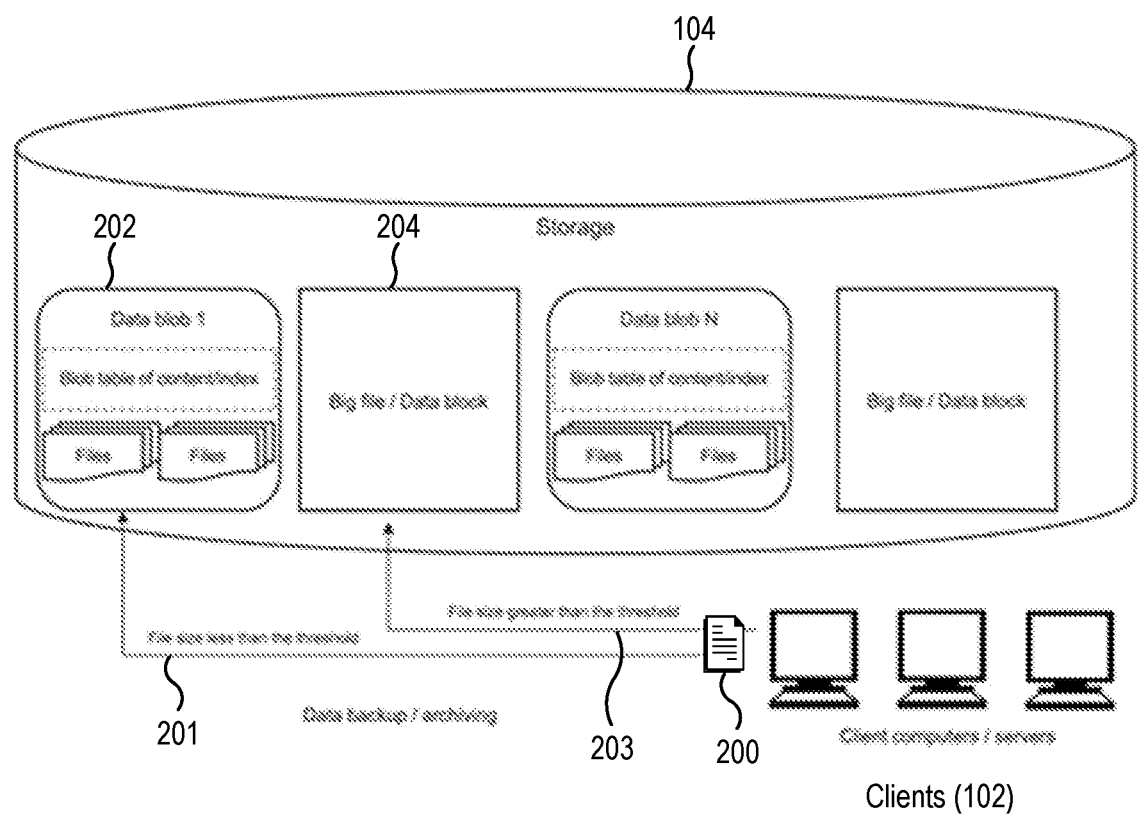
FIG. 2 is a block diagram illustrates example data backup operations using data blobs according to an exemplary aspect

FIG. 2 is a block diagram illustrates example data backup operations using data blobs according to an exemplary aspect. In the example shown, a client device may select a file 200 to be sent to the storage system 104. The client device determines the file size of the file 200 and compares the file size to the file-size threshold as determined above.

In response to determining that file size of the file 200 is less than the file-size threshold, the backup agent 106 may combine the file 200 with other files (that are also to be backed up) into a data blob 202 which is then transmitted to the object storage (action 201). In some cases, the backup agent 106 may generate a new data blob 200, insert the file 200 into a particular location within the data blob, and then update the index of the blob to include the filename of the file 200 as well as its particular location within the data blob. This process may be repeated for other files until the data blob itself has reached the file-size threshold (in a "thin" or dynamically allocated arrangement) or until no more locations within the data blob are available (in a "thick" or statically allocated arrangement). In some aspects, the created data blob may be pre-allocated a size that is equal to at least the file-size threshold value. For example, if the calculated file-size threshold is 100 MB, each new data blob may be allocated at least 100 MB in storage space.

In response to determining that the file size of the file 200 is equal to or greater than the file-size threshold, the backup agent 106 may store the file 200 as a primitive data object 204 within the object storage system 104 (action 203). For example, the file 200 may be a virtual machine image file having a 100 GB file size. As shown, both the data blob 202 and the data object 204 would be stored in the object storage at the same level of granularity and are individually retrievable with a single data access request.

It has been determined that aspects of the present disclosure may operate in an append-only mode of operation that is well-suited for data backup and archival. That is, a drawback of containing individual files 124 in a data blob 120 is that doing so would significantly raise costs of in-place modifications to those files. However, that drawback is overcome by using an append-only mode of operation, such that if a file was changed in the user's system, the updated version of that file will be added on the storage during the next backup (e.g., in an incremental or full backup). Furthermore, older versions of the file can be simply overwritten (e.g., with a new blob) according to data retention and backup policies established for a certain client device or user.

Figure 3:
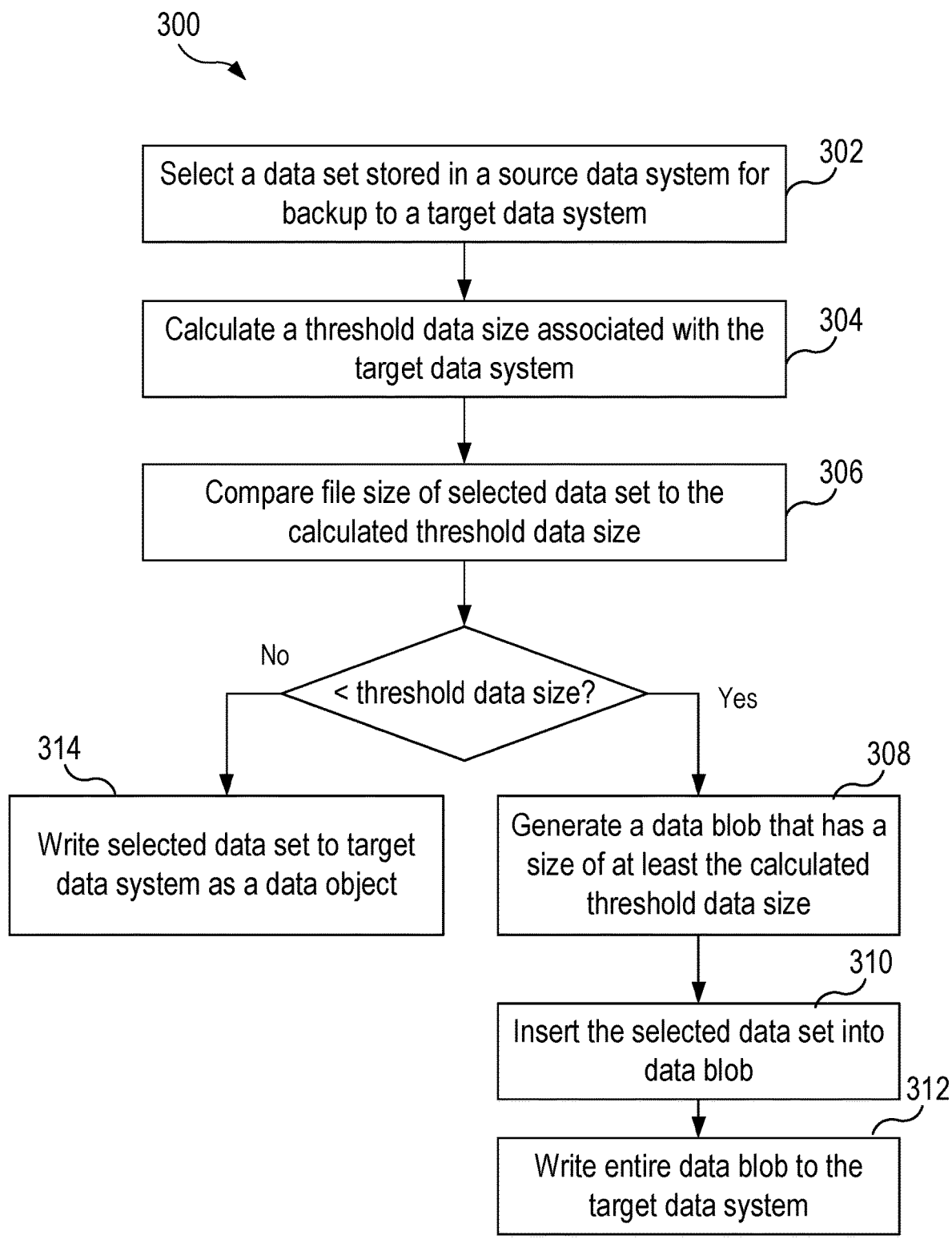
FIG. 3 is a flowchart illustrating a method for data backup and archiving according to an exemplary aspect.

FIG. 3 is a flowchart illustrating a method 300 for storing data backup and archives according to an exemplary aspect. It is noted that the following description of the exemplary method makes reference to the system and components described above.

The method 300 begins at step 302, in which a data set that is stored in a source data system (e.g., data store 114) is selected for backup to a target data system (e.g., object storage system 104).

At step 304, the backup agent 106 calculates a threshold data size associated with the target data system. In some aspects, the threshold data size associated with the target data system is determined based on a technical parameter including at least one of a storage type of the target data system, a hardware parameter associated with the target data system, and a network configuration of the target data system. In some aspects, the backup agent may determine a data parameter (e.g., a data priority score, a data access rate, or data recovery rate) associated with the selected data set, and the threshold data size is further calculated based on the data parameter associated with the selected data set. In some implementations, the threshold data size may be calculated to within a range of size values from 1 MB to 1 GB.

At step 306, the backup agent 106 compares the threshold data size and file size of the selected file to determine whether the size of the data set is less than the threshold data size. In alternative aspects, the threshold data may be configured as a less than or equal to value (i.e., the selected data set is characterized as small if the edge case in which the file size is equal to the threshold).

At step 308 (i.e., responsive to determining that the size of the data set is less than the threshold data size), the backup agent generates a data blob that is a logical container for files smaller than the threshold data size. The data blob may be created with an allocated size of at least the calculated threshold data. In some aspects, the data blob includes an index comprised of a plurality of file names and paths to the files contained in the data blob.

At step 310, the backup agent 106 inserts the selected data set into the data blob. In some aspects, the backup agent 106 updates the index of the data blob to include a reference to the selected data set. For example, the backup agent may insert into the index the filename of the selected data set and its corresponding location (e.g., address, offset) within the data blob.

At step 312, the backup agent 106 writes the data blob to the target data system. For example, the backup agent 106 may transmit an access request to the REST-based interface of the object storage system which specifies a PUT operation of the data blob. In some aspects, the data blob is written to the target data system in response to determining that a file size of the data blob exceeds the threshold data size. In other aspects, the data blob is written to the target data system in response to determining that there are no more available slots in the data blob for files.

In some aspects, rather than generate a new data blob, the backup agent may retrieving an existing data blob from the target data system, modify the retrieved data blob to include the selected data set and update its index, and then write the modified data blob back to the target data system. In yet other aspects, the backup agent may write the selected data set to a data blob already containing files and that is being kept at the client device until full.

At step 314 (i.e., responsive to determining that the size of the data set does exceed or meet the threshold data size), the backup agent 106 writes the selected data set to the target data system as a "first-order" data object.

At some subsequent point, the backup agent may receive a request to retrieve a (second) data set from the target data system. To perform data retrieval of a particular file that is stored within a data blob, the backup agent may issue to the target data system a "get blob" command indicating a reference to the data blob in which the second data set is contained. The backup agent receives the data blob, and determines the location of the second data set based on an index contained in the data blob. Then the backup agent extracts the data set from the data blob based on the determined location.

Figure 4:
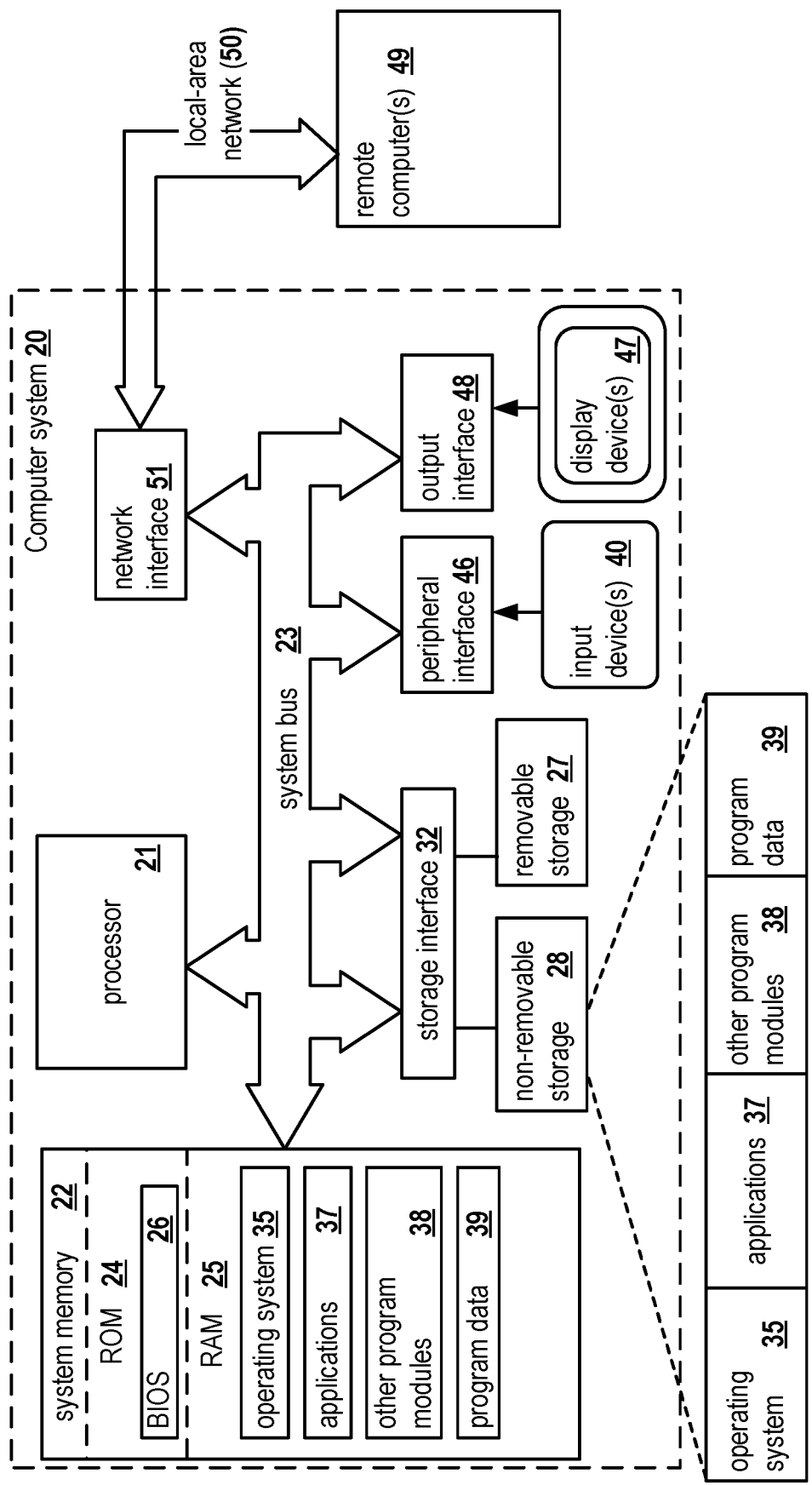
FIG. 4 is a block diagram of a computer system on which the disclosed system and method can be implemented according to an exemplary aspect.

FIG. 4 is a block diagram illustrating a computer system 20 on which aspects of systems and methods for storing data for data backup and archival may be implemented in accordance with an exemplary aspect. It should be noted that the computer system 20 can correspond to client device 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing data, the method comprising:
    determining, by a processor, a threshold data size for objects in a target data system;
    generating, by the processor, a data blob that has an allocated size of at least the threshold data size, wherein the data blob is a single indivisible binary object stored at the smallest level of granularity retrievable by access requests, and wherein the data blob comprises at least one data set;

identifying, by the processor, a data set stored in a source data system for backup to the target data system;

determining, by the processor, whether a size of the data set is less than the threshold data size; and responsive to determining that the size of the data set is less than the threshold data size, inserting, by the processor, the data set into the data blob; and writing, by the processor, the data blob to the target data system.

2. The method of claim 1, wherein the data set is a first data set, further comprising:

prior to writing the data blob to the target data system, inserting a second data set that has a file size less than the threshold data size into the data blob.

3. The method of claim 1, wherein the data blob is written to the target data system in response to determining that a file size of the data blob exceeds the threshold data size.

4. The method of claim 1, further comprising:

responsive to determining that the size of the data set is greater than or equal to the threshold data size, writing the data set to the target data system as a data object.

5. The method of claim 1, wherein the data blob includes an index comprised of a plurality of object names and paths to objects contained within the data blob.

6. The method of claim 5, further comprising:

modifying the index of the data blob to include a reference to the data set.

7. The method of claim 1, wherein determining the threshold data size associated with the target data system is based on a technical parameter comprised of at least one of a storage type of the target data system, a hardware parameter associated with the target data system, and a network configuration of the target data system.

8. The method of claim 1, further comprising:

determining a data parameter associated with the data set, wherein the data parameter is comprised of at least one of a data priority score, a data access rate, or data recovery rate associated with the data set, wherein the threshold data size associated with the target data system is determined based on the data parameter.

9. The method of claim 1, further comprising:

receiving a request to retrieve a second data set from the target data system;

issuing to the target data system a "get blob" command indicating a reference to the data blob in which the second data set is contained;

receiving the data blob;

determining the location of the second data set based on an index contained in the data blob;

extracting the data set from the data blob based on the determined location.

10. The method of claim 1, wherein contents of the data blob are transparent for user access.

11. The method of claim 1, wherein an API is utilized to insert the data set into the data blob.

12. A system for storing data, comprising:

a source data system configured to store a plurality of objects; and a hardware processor communicatively coupled to the source data system, wherein the processor is configured to:

determine a threshold data size for objects in a target data system;

generate a data blob that has an allocated size of at least the threshold data size, wherein the data blob is a single indivisible binary object stored at the smallest level of granularity retrievable by access requests, and wherein the data blob comprises at least one data set;

identify a data set stored in the source data system for backup to the target data system;

determine whether a size of the data set is less than the threshold data size; and responsive to determining that the size of the data set is less than the threshold data size, insert the data set into the data blob; and write the data blob to the target data system.

13. The system of claim 12, wherein the data set is a first data set, wherein the hardware processor is further configured to:

prior to writing the data blob to the target data system, insert a second data set that has a file size less than the threshold data size into the data blob.

14. The system of claim 12, wherein the hardware processor is further configured to write the data blob to the target data system in response to determining that a file size of the data blob exceeds the threshold data size.

15. The system of claim 12, wherein the hardware processor is further configured to:

responsive to determining that the size of the data set is greater than or equal to the threshold data size, write the data set to the target data system as a data object.

16. The system of claim 12, wherein the data blob includes an index comprised of a plurality of object names and paths to objects contained within the data blob.

17. The system of claim 16, wherein the hardware processor is further configured to modify the index of the data blob to include a reference to the data set.

18. The system of claim 12, wherein determining the threshold data size associated with the target data system is based on a technical parameter comprised of at least one of a storage type of the target data system, a hardware parameter associated with the target data system, and a network configuration of the target data system.

19. The system of claim 12, wherein the hardware processor is further configured to:

determine a data parameter associated with the data set, wherein the data parameter is comprised of at least one of a data priority score, a data access rate, or data recovery rate associated with the data set, wherein the threshold data size associated with the target data system is determined based on the data parameter.

20. A non-transitory computer readable medium comprising computer executable instructions for storing data, including instructions for:

determining a threshold data size for objects in a target data system;

generating a data blob that has an allocated size of at least the threshold data size, wherein the data blob is a single indivisible binary object stored at the smallest level of granularity retrievable by access requests, and wherein the data blob comprises at least one data set;

identifying a data set stored in a source data system for backup to the target data system;

determining whether a size of the data set is less than the threshold data size; and responsive to determining that the size of the data set is less than the threshold data size, inserting the data set into the data blob; and writing the data blob to the target data system.

* * * * *